Dec. 27, 1966  W. PRECHT  3,294,688
THERMOELECTRIC CONVERTER COMPOSITION
Filed Dec. 6, 1962  6 Sheets-Sheet 1

FIGURE OF MERIT OF GRADED STRONTIUM
CERIUM TITANATE ($SrTiO_3$ + 20 % Fe)

SEEBECK COEFFICIENT vs TEMP.
SAMPLE 25-I-2, 50% ($CeO_2$+ $TiO_2$);
50% (SrTiO + 20 % Fe)

INVENTOR.
WALTER PRECHT
BY

Dec. 27, 1966   W. PRECHT   3,294,688
THERMOELECTRIC CONVERTER COMPOSITION
Filed Dec. 6, 1962   6 Sheets-Sheet 3
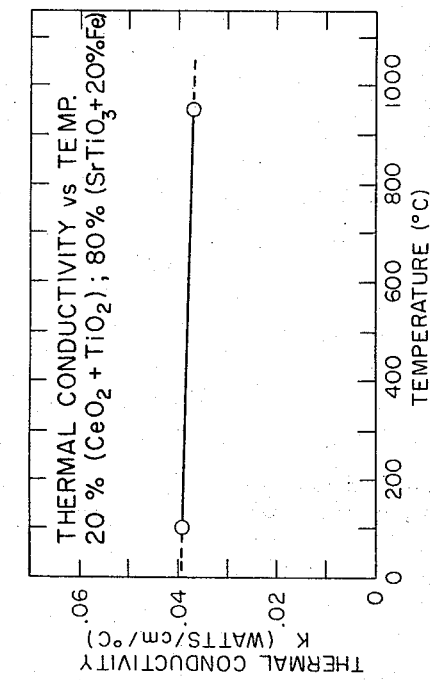
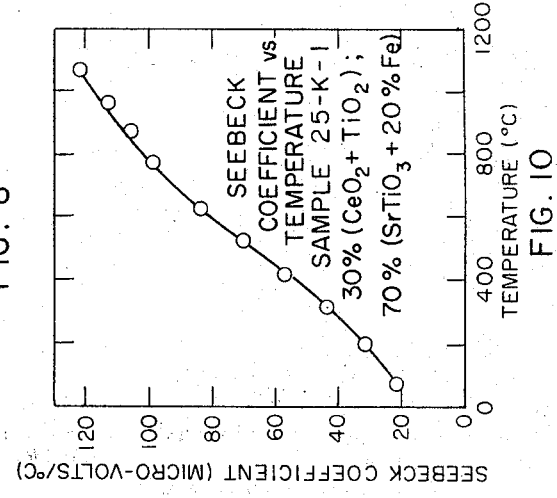
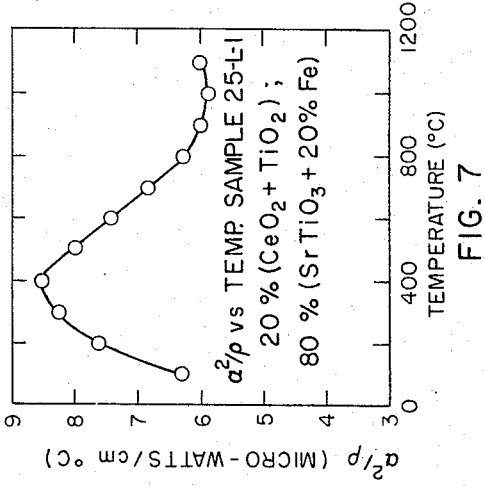
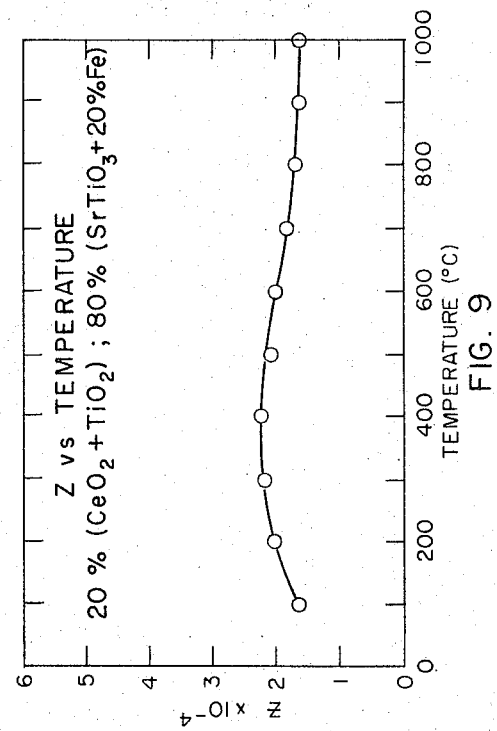
INVENTOR.
WALTER PRECHT
BY RESISTIVITY vs TEMPERATURE SAMPLE 25-K-1
30% $(CeO_2 + TiO_2)$; 70% $(SrTiO_3 + 20\text{ W/o Fe})$ $a^2/\rho$ vs TEMPERATURE SAMPLE 25-K-1
30% $(CeO_2 + TiO_2)$; 70% $(SrTiO + 20\text{ W/o Fe})$ RESISTIVITY vs TEMPERATURE SAMPLE 25-J-1
40% $(CeO_2 + TiO_2)$; 60% $(SrTiO_3 + 20\text{ W/o Fe})$ SEEBECK COEFFICIENT vs TEMP.
SAMPLE 25-J-1
40% $(CeO_2 + TiO_2)$; 60% $(SrTiO_3 + Fe)$

INVENTOR.
WALTER PRECHT
BY $a^2/\rho$ vs TEMPERATURE SAMPLE 25-J-1
40% ($CeO_2$ + $TiO_2$), 60% ($SrTiO_3$ + 20% Fe)

Dec. 27, 1966  W. PRECHT  3,294,688
THERMOELECTRIC CONVERTER COMPOSITION
Filed Dec. 6, 1962  6 Sheets-Sheet 6

RESISTIVITY MEASUREMENT ELECTRICAL CIRCUIT

SEEBECK COEFFICIENT MEASUREMENT ELECTRICAL CIRCUIT

APPARATUS FOR MEASUREMENT OF THERMAL CONDUCTIVITY

INVENTOR.
WALTER PRECHT
BY

United States Patent Office 3,294,688
Patented Dec. 27, 1966

3,294,688
THERMOELECTRIC CONVERTER COMPOSITION
Walter Precht, Towson, Md., assignor, by mesne assignments, to the United States of America as represented by the United States Atomic Energy Commission
Filed Dec. 6, 1962, Ser. No. 243,219
2 Claims. (Cl. 252—62.3)

This invention relates to compositions for thermoelectric converter elements and high temperature converter elements made from these compositions.

Single thermoelements have often been used with a separate, external, radioactive energy source to produce an electrical potential across the opposite thermoelement leads. Such an element has been provided by a lead telluride thermoelement and the external heat source has contained radioactive isotopes of strontium or cerium.

Recent investigations of the properties and characteristics of radioactive heat sources containing strontium and/or cerium have resulted in the discovery that $H_2$ sintered cerium titanate provides thermoelectric characteristics such as low electrical resistivity and a high merit factor, $\alpha^2/\rho$, where $\alpha$=the Seebeck coefficient, and $\rho$=the electrical resistance. Cerium titanate alone, however, has had poor mechanical properties at high temperatures, e.g. above 800° C., where thermoelements exposed to a radioactive heat source may operate.

It has now been discovered that improved mechanical and electrical properties can both be provided with cerium titanate when the same is formed by sintering in hydrogen a composition consisting of cerium dioxide, titanium dioxide, a high temperature stabilizer and an electrically conducting metal doping agent. Moreover, this composition may be advantageously used in a thermoelement with an external or an internal radioactive heat source whereby the element is small in size, light in weight and simple to fabricate and operate.

It is an object of this invention, therefore, to provide a composition for thermoelements containing radioactive material.

It is another object of this invention to provide a stable high temperature thermoelectric converter element that may or may not contain radio-active material;

It is another object of this invention to provide a process for making a thermoelectric converter element;

It is another object of this invention to provide a novel product by this process;

It is another object of this invention to provide a process for making a low electrical resistivity composition for a thermoelectric converter assembly containing radioactive material;

It is another object of this invention to provide a high temperature cerium titanate composition;

It is another object of this invention to provide a low electrical resistivity cerium titanate composition;

It is another object to provide a cerium titanate composition that is readily and easily fabricated.

This invention contemplates, in one embodiment, a composition containing cerium titanate, iron and strontium titanate; a thermoelement made from this composition; and a hydrogen sintering process for making this element and the compositions thereof.

By varying the proportions of the ingredients between 50% to 80% stabilizer containing strontium titanate with 20% iron, and from 20% to 50% cerium titanate this composition has many important advantages among which are high temperature stability, low electrical resistivity, high figure of merit, and ready, easy and inexpensive fabrication.

Various other objects and advantages will appear from the following description of several embodiments of this invention, and the novel features will be particularly pointed out hereinafter in the appended claims.

$$(CeO_2+TiO_2)$$

Figure 2:
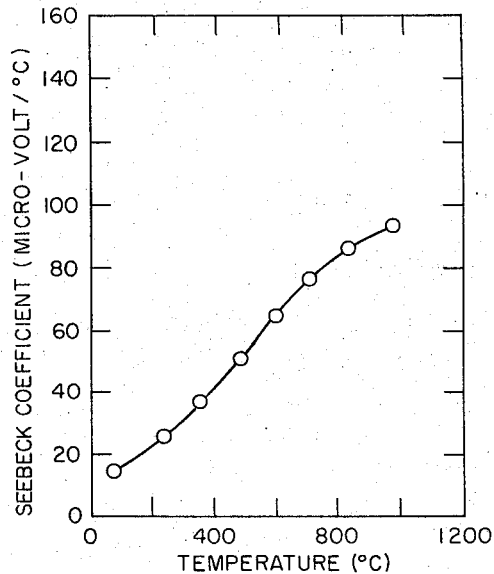
FIG. 2 is a graph of the Seebeck coefficient ($\alpha$) vs. temperature of a composition consisting of 50%
Figure 3:
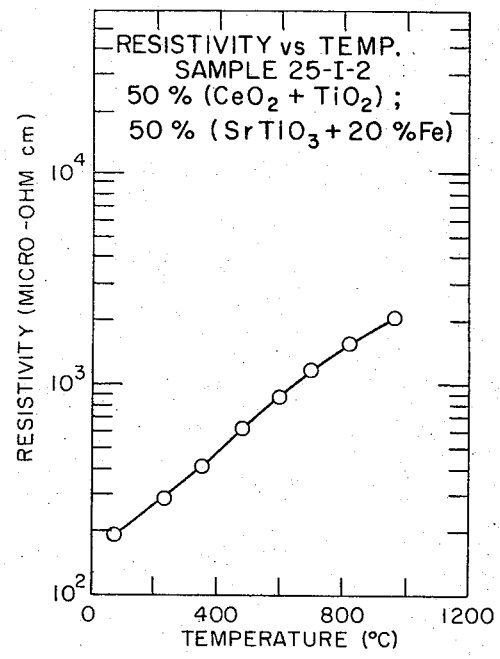
Figure 4:
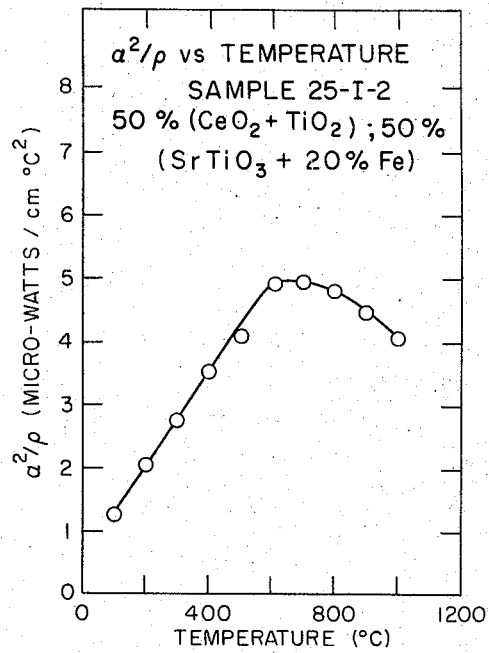
Figure 5:
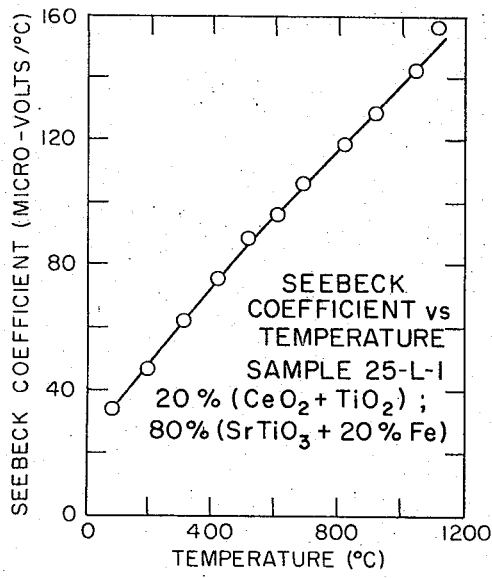
Figure 6:
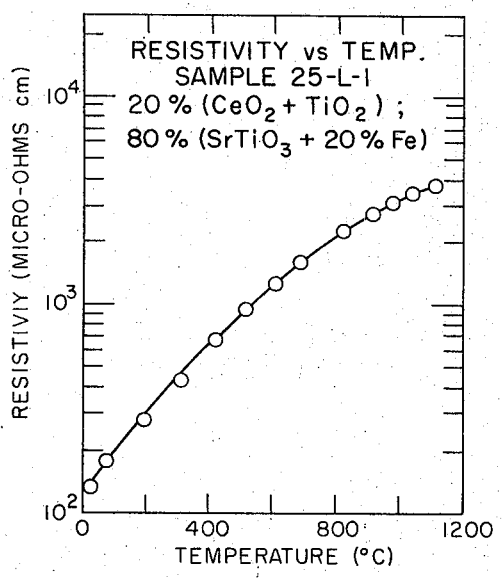
Figure 11:
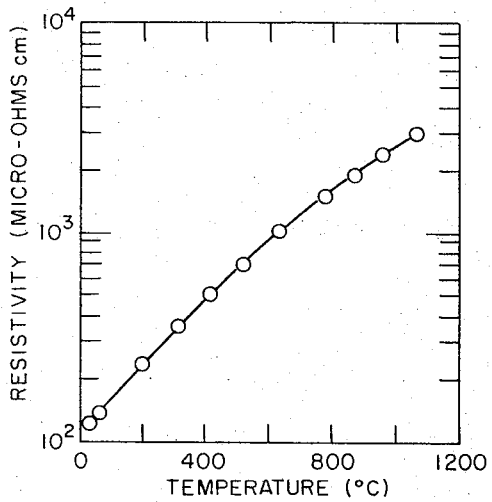
Figure 12:
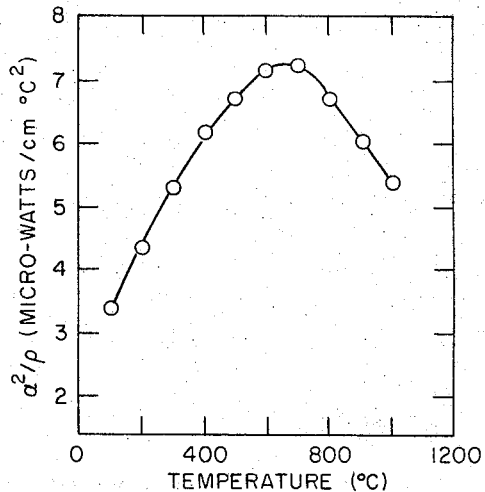
Figure 13:
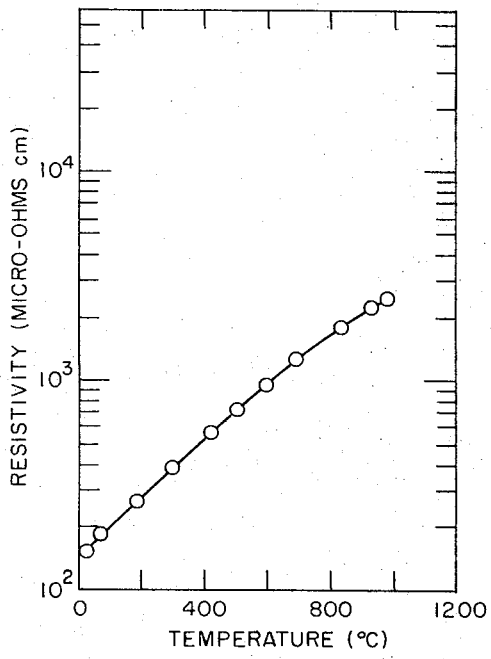
Figure 14:
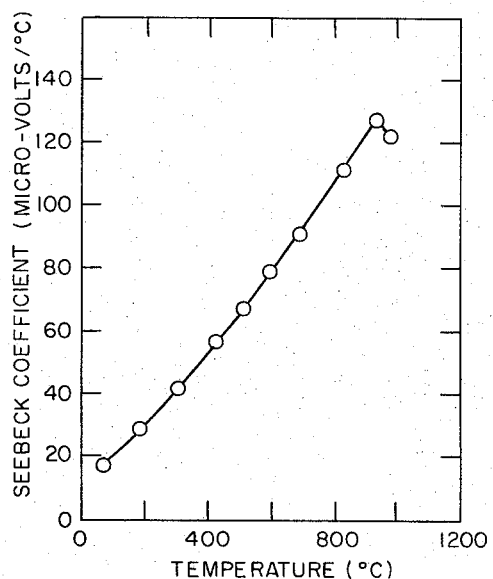
Figure 15:
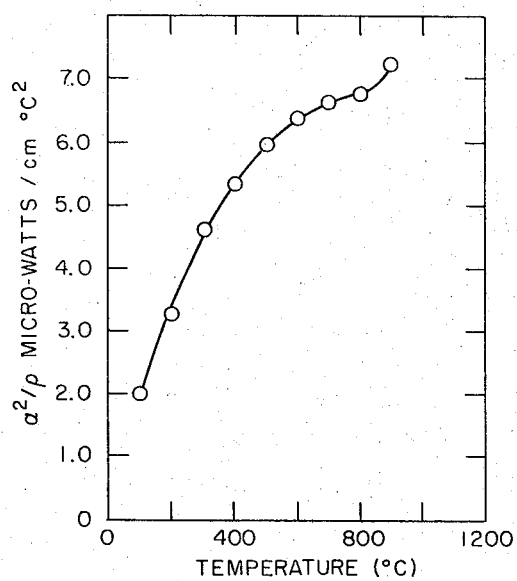
Figure 16:
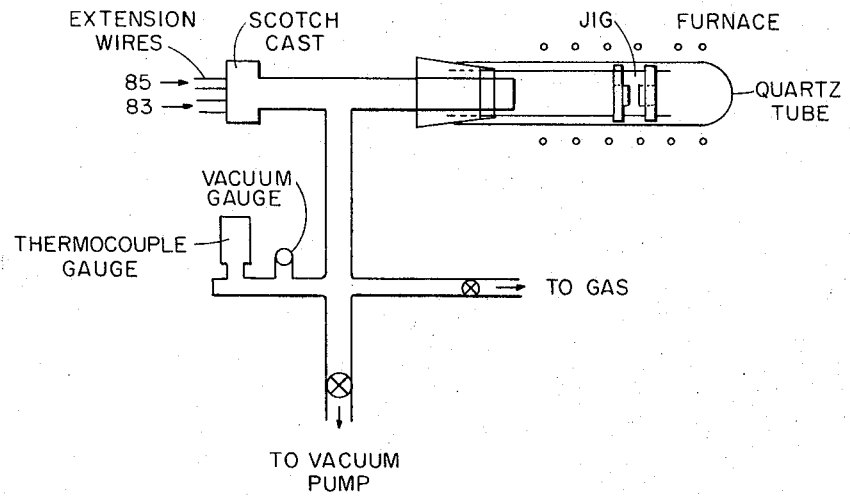
Figure 17:
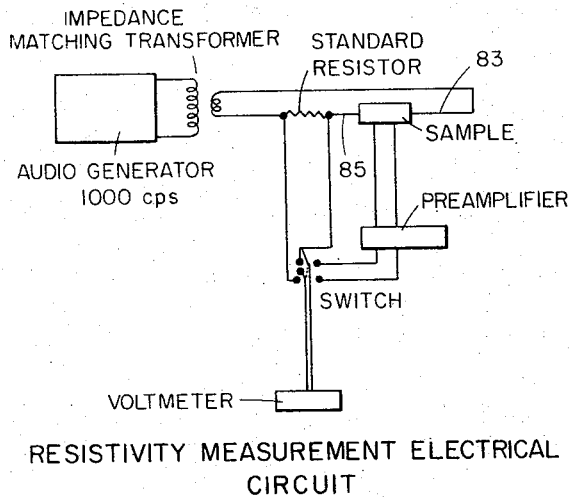
Figure 18:
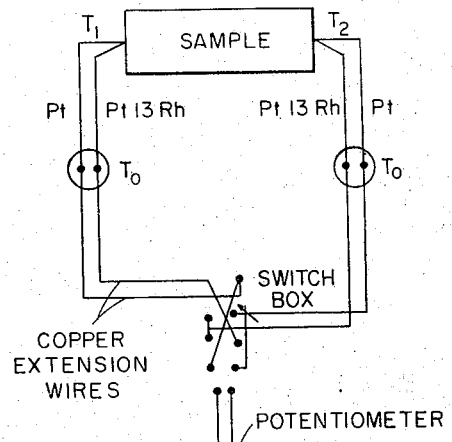
Figure 19:
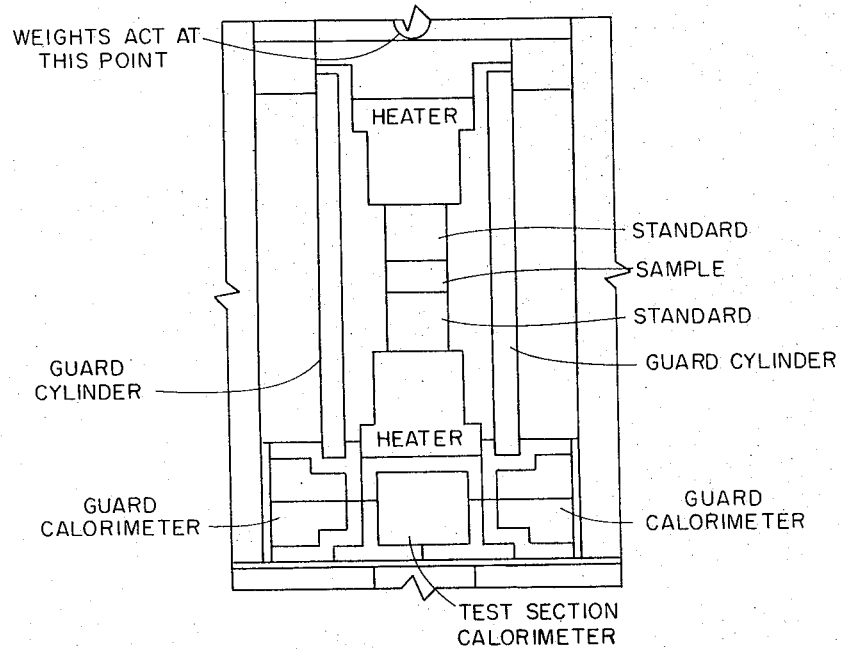

and 50% ($SrTiO_3$+20% Fe);

FIG. 3 is a graph of electrical resistivity ($\rho$) vs. temperature of the composition of FIG. 2;

FIG. 4 is a graph of the merit factor ($\alpha^2/\rho$) vs. temperature of the composition of FIG. 2;

FIG. 5 is a graph of the Seebeck coefficient vs. temperature of a composition consisting of 20% ($CeO_2+TiO_2$) and 80% ($SrTiO_3$+20% Fe);

FIG. 6 is a graph of electrical resistivity vs. temperature of the composition of FIG. 5;

FIG. 7 is a graph of the merit factor ($\alpha^2/\rho$) vs. temperature of the composition of FIG. 5;

FIG. 8 is a graph of the thermal conductivity vs. temperature of the composition of FIG. 5;

FIG. 9 is a graph of the figure of merit Z vs. temperature of the composition of FIG. 5, where $Z=\alpha^2/\rho k$ and $k=$ the thermal conductivity;

FIG. 10 is graph of the Seebeck coefficient vs. temperature of a composition consisting of 30% ($CeO_2+TiO_2$) and 70% ($SrTiO_3$+20% Fe);

FIG. 11 is a graph of the electrical resistivity vs. temperature of the composition of FIG. 10;

FIG. 12 is a graph of the merit factor vs. temperature of the composition of FIG. 10;

FIG. 13 is a graph of the resistivity vs. temperature of a composition consisting of 40% ($CeO_2+TiO_2$) and 60% ($SrTiO_3$+20% Fe);

FIG. 14 is a graph of the Seebeck coefficient vs. temperature of the composition of FIG. 13;

FIG. 15 is a graph of the merit factor vs. temperature of the composition of FIG. 13;

FIG. 16 is a schematic view of the Seebeck resistivity measurement apparatus for the composition of this invention;

FIG. 17 is a schematic view of the resistivity measurement apparatus for the apparatus of FIG. 16;

FIG. 18 is a schematic view of the Seebeck coefficient measurement circuit for the apparatus of FIG. 16;

FIG. 19 is a schematic view of the thermal conductivity measurement apparatus for the composition of this invention.

Referring to FIG. 11 on page 29 of Martin Company report MND 2584-2 a thermoelectric thermoelement for producing an electrical potential across its opposite end terminals is shown. This thermoelement is particularly useful for supplying electrical power in remote locations, such as in space vehicles where a simple, easy to fabricate, dependable, low wattage, electrical power source is required.

Figure 1:
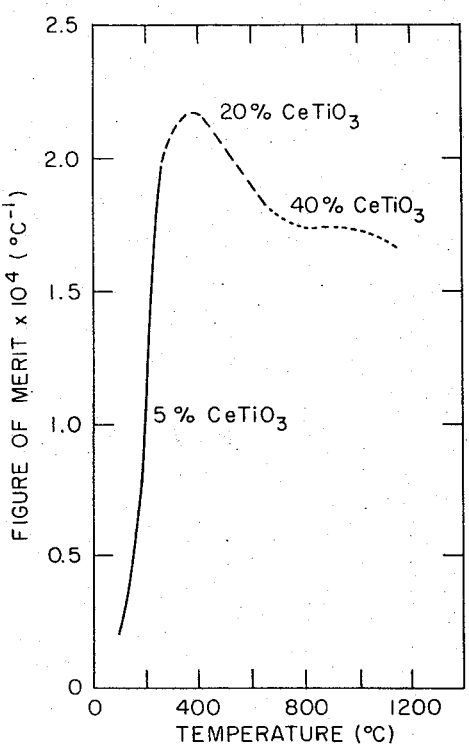
FIG. 1 is a graph of the figure of merit of various compositions containing hydrogen sintered cerium titanate and strontium titanate containing 20% iron.

In accordance with this invention, it has been discovered that metal doped, hydrogen sintered, cerium titanate/$SrTiO_3$ is advantageous for such a thermoelement. Advantageously this cerium has a radioactive isotope e.g. cerium 144, which can be placed at one end of the element with natural cerium titanate throughout the remainder of the element. Both blends are individually mixed with iron for a metallic doping agent and strontium titanate is added for a stabilizer. Adjustments are made in the proportions of these ingredients from 50% to 80% strontium titanate containing 20% iron and from 20% to 50% cerium titanate wherein the increase of strontium titanate tends to give enhanced stability to mechanical and chemical breakdown at high temperatures. At least 50% strontium titanate gives stability up to 1000° C. Increased cerium titanate tends to decrease the electrical resistance of the composition but the optimum figure of merit over a wide temperature range from room temperature to over 1000° C. is provided by a proportion of 20% by weight cerium titanate and 80% by weight strontium titanate containing 20% by weight iron as illustrated in FIG. 1. The described composition has good mechanical properties similar to those of air-sintered undoped strontium titanate, including good compressional strength, rigidity and ability to withstand mechanical and thermal shock, and combines these with low resistivity and high figure of merit properties of hydrogen sintered cerium titanate.

In accordance with this invention the sequence for providing the cerium titanate comprises wet ball milling cerium dioxide and titanium dioxide in a 1:1 mole ratio using about four parts by weight of distilled water to one part by weight of the cerium dioxide/titanium oxide blend. After this mixing the slurry is filtered and the residue placed in an oven to evaporate the remaining water. Pyrophoric iron having a median particle size of less than .05 micron in diameter and strontium titanate may also be mixed therewith. The dry blend is pressed with a compacting load of from 700 to 2800 kg./cm.$^2$, preferably in the absence of air in an argon atmosphere, to form a thermoelement. Advantageously cerium 144 and/or strontium 90 are compacted at one end of the thermoelement. A furnace having a dry hydrogen atmosphere then sinters this blend for about 16 hours at 1200° to 1460° C. to form cerium titanate. The hydrogen is advantageously dried to a dew point of about −40 and introduced through the muffle of a muffle furnace and allowed to burn at the muffle ends.

The described cerium titanate has a low electrical resistivity, which is much lower than could be expected from like measurements of air sintered or reduced strontium titanate ($SrTiO_3$). The formulation of this cerium titanate is $CeTiO_3$ as shown by the following comparative X-ray diffraction data of titanates of strontium, europium and cerium:

Table 1

X-RAY DIFFRACTION DATA OF TITANATES OF STRONTIUM, EUROPIUM AND CERIUM

| $SrTiO_3$ ($a_0$=3.905) | | $EuTiO_3$ ($a_0$=3.905) | | $CeTiO_3$ ($a_0$=3.915) | |
|---|---|---|---|---|---|
| $I/I_1$ | d | $I/I_1$ | d | $I/I_1$ | d |
| 100 | 2.76 | 100 | 2.76 | 100 | 2.77 |
| 50 | 1.95 | 40 | 1.59 | 40 | 1.60 |
| 40 | 1.59 | 30 | 1.95 | 35 | 1.96 |
| 30 | 2.25 | 25 | 2.25 | 20 | 2.26 |
| 25 | 1.38 | 20 | 1.24 | 15 | 1.24 |
| 15 | 1.24 | 20 | 1.04 | 15 | 1.38 |

$a_0$=principal lattice space, A.
I=intensity of line.
$I_1$=intensity of strongest line=100.
d=wavelength, A.

The X-ray diffraction patterns of air-sintered cerium oxide-titanate oxide samples show the presence of the original components with a slight evidence of another phase; the material sintered in hydrogen shows a pattern very similar to strontium titanate and europium titanate. The "d" spacing values are closer to the europium titanate, $EuTiO_3$, which can be expected as the cerium dioxide starting material is likely to be reduced to the sesquioxide state during the hydrogen sintering operation. The results indicate that cerium titanate, $CeTiO_3$, a previously unreported compound, has been formed. The X-ray diffraction data are summarized in Table 1. The density of $CeTiO_3$ is approximately 5.7 gm./cm.$^3$. The crystal structure is thought to be perovskite.

The activation energy $E_a$ of five specimens of this $CeTiO_3$ was measured by the diffuse reflection technique. The specimens all exhibited two absorption bands. The results of the monochromatic reflectivity are summarized as follows:

Table 2

ACTIVATION ENERGY OF TITANATES

| Sample No. | Composition [1] (wt. percent) | Band No. | Wave-length, A. | Energy (ev) |
|---|---|---|---|---|
| 25-L-2 | 16% Fe, 20% $CeTiO_3$ | 1 | 4,460 | 2.77 |
| 25-L-2 | 16% Fe, 20% $CeTiO_3$ | 2 | 5,930 | 2.08 |

[1] Balance is $SrTiO^3$.

Other titanates having the same titanate form comprise the following alkali metal titanates, rare earth titanates, actinide titanates and lanthanide titanates: $BaTiO_3$, $NdTiO_3$, $SmTiO_3$, $GdTiO_3$. As $BaTiO_3$ can be substituted for $SrTiO_3$ the $BaTiO_3$ should lower the thermal conductivity because of the higher atomic weight of barium. If curium titanate be substituted for the $SrTiO_3$ and only one percent of the decay energy of curium 242 is converted to electrical energy, an electrical power density of more than 10 watt/cm.$^3$ is produced. Other metal doping agents that have high electrical conductivity comprise Zr, Cr, Fe, W, Co and Ni.

The strontium metatitanate used in the described composition is a high temperature material with good mechanical strength, chemical stability and a low solubility in sea water. It is produced by hydrogen sintering and is advantageously produced from $SrCo_3+TiO_2$ which is calcined at 1200° C. and sintered at 1460° C. for about 16 hours in a hydrogen atmosphere furnace. It was found that the ingredients should be handled carefully in all cases to prevent oxidation.

Various performance tests of the described materials were made, and the results of these observations are illustrated by FIGS. 1–15. In these cases the ceric oxide and titanium dioxide reacted to form cerium titanate, which has been identified as above described. Blends of cerium titanate and iron doped strontium titanate have merit factors (Seebeck coefficients squared, divided by electrical resistivity) of $7 \times 10^{-6}$ watt cm.$^{-1}$ ° C.$^{-2}$ or more from 100° to 1000° C.

The results of titanate blends were considerably different than the equivalent individual blend by themselves. For example, 20 w/o addition of pyrophoric iron to cerium titanate has a room temperature resistivity of ~500 microohms-cm. as compared to ~3000 microohms-cm. for strontium titanate with an equivalent amount of metal powder. The Seebeck output, however, for this same cerium titanate blend is only ~80 μv./° C. at 700° C. while the equivalent strontium titanate ~200 μv./° C. By sintering in hydrogen a blend of strontium titanate, iron and the various additions of a 1:1 mol ratio of cerium dioxide and titanium dioxide, the average room temperature resistivity of these blends is ~150 microohms-cm., which is considerably less than any of the separate constituents. The Seebeck output, although lower than the base (strontium titanate, 20 w/o iron) is above the plain cerium titanate with metal additions. There is, therefore, an improvement, in the merit factor and figure of merit over the individual constituents or blends without cerium titanate and there is an improvement in stability over the cerium titanate by itself. By varying the proportions of the cerium titanate and strontium titanate as described, an average figure of merit $1.9 \times 10^{-4}$ deg.$^{-1}$ C. between 200° C. and 1100° C.

has been achieved. There was an improvement over metal doped strontium titanate by itself as shown by the following table:

*Table 3*

ROOM TEMPERATURE RESISTIVITY (H₂ SINTERED TITANATE)

| Plain Titanates | | Blend Titanates |
|---|---|---|
| Strontium Titanate, ohm cm. | Cerium Titanate, ohm cm. | Strontium/Cerium Titanates |
| No additives .05 | .007 | 80% SrTiO₃—.0009 ohm cm. 50% SrTiO₃—.0005 ohm cm. |
| Plus 20% Fe .002 | .0005 | 10–16% Fe—.00015 ohm cm. From 40% SrTiO₃ through 75% SrTiO₃. |

FIGS. 17 and 18 show the apparatus employed to measure the Seebeck coefficient and electrical resistivity directly and independently under different ambient temperatures, from room temperature to 1200° C. The specimen holder is placed inside a quartz tube evacuated to about 10 mm. of Hg and located in a horizontal Kanthal furnace (not shown). The holder comprises two lava discs held in place by three threaded Inconel rods. Springs outside the hot zone of the furnace press the discs to hold the specimen between the discs and a steel shield holds fibrous microquartz around the quartz tube.

The temperature at two different points on the sample provides the Seebeck coefficient. To this end springs (not shown) press platinum and platinum 13%–rhodium thermocouples 83 and 85 (30 gauge wire) against two surfaces respectively of the sample. These same thermocouples also serve as voltage probes for measuring the Seebeck voltage (FIG. 17). The necessary temperature gradient of 10° to 30° along the sample is obtained by placing the sample unsymmetrically in the hot zone of the furnace.

To measure the resistivity of the sample, a suitable source applies a 1000 cycle per second alternating current through the sample from one thermocouple lead to the other as shown in FIG. 17. The voltage drop along the specimen is measured between the contacts of the sample which are recessed so as to surround the ends of the sample. Equipotential planes are thus established in the sample, just inside and parallel to its ends, and these planes are at the same potential as the respective contacts.

The electrical circuit for these measurements is also shown schematically in FIGS. 17 and 18. The two thermocouples 83 and 85 connect through a suitable switch to a K–3 potentiometer. The potentiometer measures the Seebeck voltage once in reference to the Pt wire and once in reference to the Pt 13%–Rh wire.

The apparatus for measuring the thermal conductivity is shown in FIG. 19. This apparatus is a modification of the standard cut-bar system by A. D. Kingery. The temperature range was 50° to 1370° C.

A method of making cerium titanate by itself comprises wet ball milling of cerium dioxide and titanium dioxide using in a 1:1 mole ratio about four parts of distilled water to one part of cerium dioxide titanium dioxide blend. After milling, the slurry is filtered and the residue is placed in an oven to evaporate the remaining water. The dry blend then is pressed, preferably in the absence of air, into pellets using a compacting load of from 700 to 2800 kg./cm.² Advantageously, cerium 144 can be concentrated at one end. A furnace having a hydrogen atmosphere then sinters this oxide blend for 16 hours at 1200° C. to 1460° C. to form cerium titanate. The hydrogen is dried to a dew point of −40 or less, introduced through the furnace muffle and allowed to burn at the muffle ends.

This invention provides a new composition for a high temperature thermoelectric converter element, a new process for making the element, and a new process for making the constituents of the element. All of these are advantageous in providing a new and improved power source that is simple, and easy to fabricate. Additionally these thermoelements and compositions therefor have high operating temperatures compared with other intermetallic type elements, have exceptionally low resistivity values compared to known oxide thermoelements, and can be used with internal radioactive heat sources.

I claim:

1. A composition for a thermoelectric converter element, consisting essentially of between 50% and 80% strontium titanate containing 20% iron, and between 20% and 50% cerium titanate.

2. A composition for a thermoelectric converter element, consisting essentially of 20% cerium titanate, and 80% strontium titanate containing 20% iron.

References Cited by the Examiner

UNITED STATES PATENTS 2,852,400 9/1958 Remeika _____ 252—62.3
2,985,700 5/1961 Johnston ____ _____ 136—239

OTHER REFERENCES

Roth: Classification of Perovskite and Other ABO₃-type Compounds, Journal of Research of the National Bureau of Standards, vol. 58, No. 2, February 1957, Research Paper 2736, pages 86–87.

HELEN M. McCARTHY, *Acting Primary Examiner.*
TOBIAS E. LEVOW, R. D. EDMONDS,
*Assistant Examiners.*